(No Model.)
F. WHEATON.
UNDERGROUND CONDUIT FOR ELECTRIC WIRES.
No. 346,250. Patented July 27, 1886.
Fig. 1.
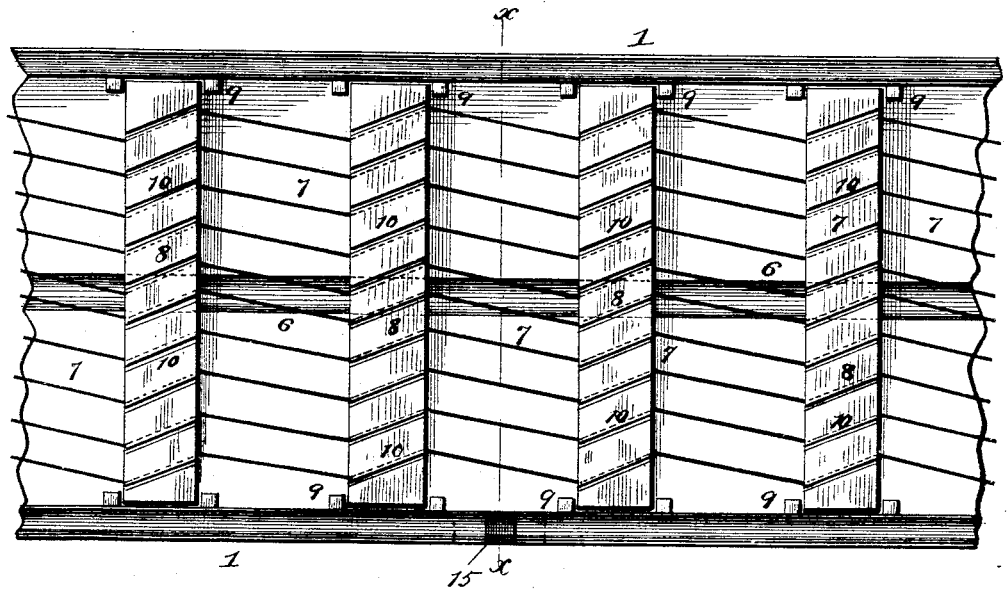
Fig. 2.
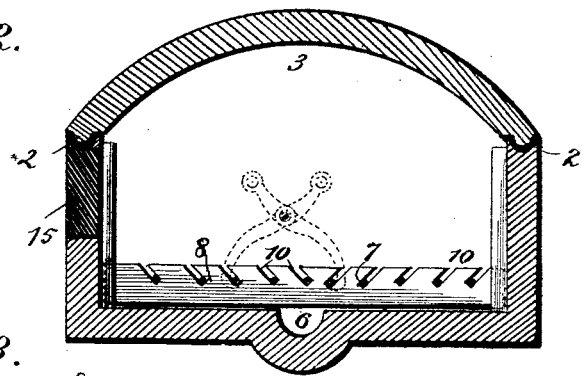
Fig. 3.
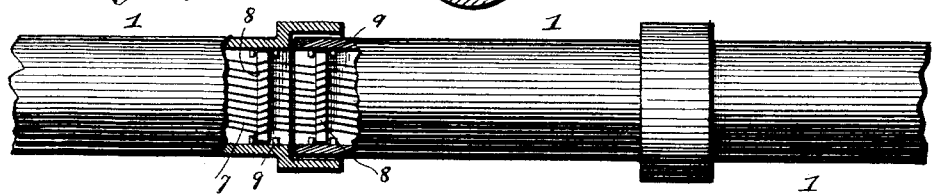
Fig. 4.
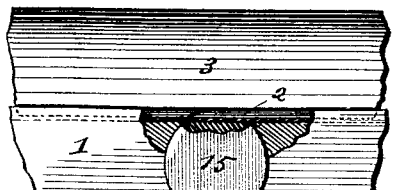
Fig. 5.
WITNESSES
Phil C. Dietrich.
Robert Everett.
INVENTOR
Frank Wheaton
by A. M. Tanner
Attorney

UNITED STATES PATENT OFFICE.

FRANK WHEATON, OF NEW YORK, N. Y., ASSIGNOR TO THE WHEATON SUB-ELECTRIC CONDUIT COMPANY.

UNDERGROUND CONDUIT FOR ELECTRIC WIRES.

SPECIFICATION forming part of Letters Patent No. 346,250, dated July 27, 1886.

Application filed November 17, 1885. Serial No. 183,126. (No model.)

*To all whom it may concern:*

Be it known that I, FRANK WHEATON, a citizen of the United States, residing at New York, in the county of New York and State of New York, have invented certain new and useful Improvements in Underground Conduits for Electric Wires; and I do hereby declare the following to be a full, clear, and exact description of the invention, such as will enable others skilled in the art to which it appertains to make and use the same.

The object of the present invention is to provide an underground conduit for electric wires, which shall be simple in construction and a most reliable medium for retaining and insulating the wires, special provision being also made for gaining access to the interior of the conduit, and the devices for supporting the wires in tiers being so contrived that any of the tiers or layers of wire can be manipulated or lifted without disengaging them from their insulating-supports. Furthermore, it is the aim of the present invention to inclose electric wires in a conduit from which moisture is practically excluded, the slight drainage which might pass into the conduit being led away and prevented from reaching the wires.

The invention consists in the construction and arrangement of devices, which will be hereinafter more fully described, and then set forth in the claims.

In the accompanying drawings, Figure 1 is a plan view of a conduit constructed according to my invention, the cover being removed to show the arrangement of the wire-holders. Fig. 2 is a transverse section of the complete conduit. Fig. 3 is a plan or top view showing several conduit-sections with parts broken away to exhibit the interior wires. Fig. 4 is a detail view of part of the conduit, showing the lead-plugged hole for tapping the same. Fig. 5 is a detail view of a glass wire-holder, showing more clearly the formation of the grooves therein for retaining the wires.

The reference-numeral 1 designates a trough or casing, which is constructed of cast metal or other appropriate material, and is provided with a straight bottom and side walls. The upper edges of said side walls are channeled or grooved and receive a bead, 2, formed on an arched or vaulted cover, 3, a layer of cement being interposed between the channels in the side walls and the beads on the cover, in order to insure the formation of an air and liquid tight joint between said parts.

It is the intention to construct my conduit of sections of an appropriate length, and, as shown in Fig. 3, several sections are joined together by slipping the smaller end of each section into the enlarged end or muff of an adjoining section, a packing of cement being generally resorted to for hermetically sealing the slip-joints thus formed.

In practice I propose to lay my conduits into a cement-lined trench, and to place a layer or covering of cement on the lid of the conduit. The object of this arrangement is to inclose the conduit in a trench, into which water cannot percolate. It may happen, however, by some defect in laying the conduit, or some accidental cause, that water finds an entrance into the conduit, and hence I form a gutter, 6, in the bottom of each conduit-section for conveying such water into a man-hole or trap located at proper intervals along the line of the conduit.

The wires serving as electric conductors are laid in the conduit in tiers or layers, in contradistinction to being bunched or put up in cable form, such disposition of the wires being the most practicable and desirable, since it simulates the arrangement of overground wires.

I designate one row or tier of wires by the numeral 7, other and superposed tiers being omitted in the drawings as being a mere duplication of the arrangement shown.

The wires are held at suitable intervals by means of glass plates or blocks 8, which are made with smooth sides and ends, and are fitted between ribs 9, formed on the side walls of the conduit. It will thus be seen that the movement or displacement of such blocks or wire-holders is effectually prevented. Furthermore, the ribs 9 add to the strength and durability of the conduit.

It is to be assumed that a number of blocks or plates 8 are superposed, so as to hold a corresponding number of layers of wire; but, as already stated, I have only shown one tier of blocks and wires.

In the upper surface of each glass block or wire-holder I form a series of diagonal grooves, 10, which all run in the same direction, as is clearly seen in Fig. 1. One half of these grooves in each block are undercut in one direction, and the other half in an opposite direction, as is shown in Figs. 2 and 5. This formation of the grooves is a very important feature, since it causes the wires to lie in seats, from which they cannot be drawn when handling a tier of wires for the purpose of gaining access to others beneath. It will be seen that the wires resting in seats having overhanging walls or ledges, which run in opposite directions, as already stated, can be seized by an ordinary grappling implement and raised with the attached block or glass holder. Such a manipulation of the wires for purposes of repairs and making local connections could not take place if the grooves were made with straight sides, or if they were not undercut in reverse directions, as herein shown. It is evident, also, that the diagonal grooves in the glass blocks or plates insure the firm retention of the wires without the aid of wedges or other fastening devices, the bends or angles made by the wires being sufficient to hold the same in place when the wires are drawn taut.

In order to permit the conduit to be easily and quickly tapped for making a connection with local wires, I provide each conduit-section with one or more lead-plugged openings. This feature is represented in Figs. 2 and 4 of the drawings, in which 15 is a filling of lead applied by pouring molten lead into a mold embracing the wall of the conduit. This lead filling extends to the groove or channel in the conduit, or, in other words, the top of said filling constitutes part of the bottom of the channel in the conduit. The object of this formation is to permit the plug to be cut into from the top by means of a suitable instrument, thus greatly facilitating its removal for the purpose of making connections with branch wires.

An underground conduit constructed according to my invention may be said to be practically air and water tight, and being simple in construction it is cheaper in comparison with systems heretofore devised. Furthermore, the presence of the glass holders insures the perfect insulation and retention of the wires, and since such holders have undercut grooves the wires and holders can be manipulated by a simple tool, which cannot be done with blocks having straight grooves, as in so-called "French system" of Boudain, patented in France in the year 1854.

Having thus described my invention, what I claim as new, and desire to secure by Letters Patent, is—

1. In combination with an underground conduit, a plate or slab of insulating material lying transversely thereof, and having in its upper face diagonal undercut grooves for containing the wires, the grooves on one side of the center of the plate being undercut in an opposite direction from those on the other side of the center, as herein set forth.

2. The herein-described conduit for electric wires, having a tapping hole or slot extending from its upper edge into the wall thereof, said tapping hole having cast therein a soft-metal plug, the upper surface of which forms part of the top edge of the wall of the conduit, substantially as and for the purpose set forth.

In testimony whereof I affix my signature in presence of two witnesses.

FRANK WHEATON.

Witnesses:
H. A. HALL,
A. M. TANNER.